United States Patent [19]

Munk

[11] Patent Number: 5,213,821
[45] Date of Patent: May 25, 1993

[54] APPARATUS FOR MANUFACTURING AN ELONGATE COVER PROFILE

[75] Inventor: Edmund Munk, Oberstenfeld, Fed. Rep. of Germany

[73] Assignee: Werzalit AG & Co., Oberstenfeld, Fed. Rep. of Germany

[21] Appl. No.: 514,846

[22] Filed: Apr. 25, 1990

Related U.S. Application Data

[62] Division of Ser. No. 359,095, May 26, 1989, Pat. No. 5,016,416.

[30] Foreign Application Priority Data

Nov. 5, 1988 [DE] Fed. Rep. of Germany .............. 88118489[U]

[51] Int. Cl.⁵ .............................. B29C 35/00
[52] U.S. Cl. .............................. 425/406; 425/407; 425/412; 425/416
[58] Field of Search ............... 425/408, 332, 177, 346, 425/352, 406, 412, 416, 407; 264/109, 113, 120

[56] References Cited

U.S. PATENT DOCUMENTS

| | | | |
|---|---|---|---|
| 2,251,858 | 8/1941 | Snell | 425/408 |
| 3,248,758 | 5/1966 | Schmitz et al. | 425/408 |
| 3,423,267 | 1/1969 | Munk | 264/120 |
| 3,492,771 | 2/1970 | Jones et al. | 52/144 |
| 3,581,453 | 6/1971 | Jones et al. | 52/144 |
| 3,764,243 | 10/1973 | Gambill et al. | 425/408 |
| 4,334,663 | 6/1982 | Ponginibbio | 425/408 |
| 4,419,319 | 12/1983 | Reynolds, Jr. et al. | 264/322 |
| 4,544,345 | 10/1985 | Bühler et al. | 425/332 |
| 4,569,807 | 2/1986 | Boudet | 425/332 |
| 4,788,023 | 11/1988 | Bühler et al. | 425/408 |
| 4,789,328 | 12/1988 | Knoll | 425/394 |
| 4,948,355 | 8/1990 | Knoll | 425/384 |

FOREIGN PATENT DOCUMENTS

| | | | |
|---|---|---|---|
| 0117256 | 9/1984 | European Pat. Off. | 425/408 |
| 2155571 | 5/1973 | Fed. Rep. of Germany | 264/120 |

Primary Examiner—Jay H. Woo
Assistant Examiner—Robert B. Davis
Attorney, Agent, or Firm—Michael J. Striker

[57] ABSTRACT

A pressed elongate cover profile made from a mixture of a fiber material and a binding material and having opposite end portions, a groove formed in one of said opposite end portions, a tongue on the other of said opposite end portions, a wall thickness which changes continuously from the one end portion to the other end portion, and a greater packing of an end portion with a greater wall thickness than that of the end portion with a smaller wall thickness, at least an outer surface of the cover profile which is visible after mounting of the cover profile, being lined with a firmly attached protective layer, and a method of and an apparatus for manufacturing such a cover profile.

3 Claims, 2 Drawing Sheets

APPARATUS FOR MANUFACTURING AN ELONGATE COVER PROFILE

This is a division of application Ser. No. 359,095 filed May 26, 1989 now U.S. Pat. No. 5,016,416.

BACKGROUND OF THE INVENTION

The invention relates to a pressed elongate cover profile made from a mixture of a fiber material and a binding material and having a groove formed in one end portion thereof and a tongue on the other end portion thereof. Such cover profiles are used, in particular, for covering facades of buildings.

Such a cover profile is disclosed in German patent 2,530,263. A chiplike of fibrous mixture used for manufacturing profiles can contain small cellulose particles such as shredded and dried wood chips, cane fibers, etc. admixed to a thermosetting binding material on the basis of thermosetting plastics such as melamin, urea formaldehyde or phenolformaldehydrate. Instead of wood or cane particles, other fibers, such as glass fibers, cottonized, or asbestos fibers, can be used. They can be used separately or mixed with each other and then admixed to a corresponding preferably organic, binding material.

Profile bodies such as table plates, window seats, pallets and the like, can be produced from this mixture so that the non-raisable mixture, depending upon the shape or desired properties of the finished profile body, is filled in the press lower part of a molding press to form a maximum possible uniformly thick layer or a layer having different thicknesses at predetermined locations. The thickness of the mixture layer in the lower part of a molding press usually exceeds that of a finished pressed profile from four to seven times. When the press in question is a premolding press, the mixture filling a molding chamber defined by a lower press part, is compressed by movement of an upper press ram (upper press part) and becomes compressed almost to its final condition. The density of a such formed blank is sufficient to prevent deformation or damage of the blank when it is removed from the molding press. Thereafter, the blank covered with a covering layer is placed in a press for hot pressing where the blank, under action of pressure and heat, takes its final shape, is hardened and becomes integral with its covering layer.

The known cover profiles proved themselves in many cases. However, for their intended use, they can be further improved. When a horizontal outer wall is covered with known cover profiles, ring-shaped cavities are formed in which, in an unfavorable climate or under unfavorable wheather conditions, dirt and the like accumulates and a premature erosion may occur.

SUMMARY OF THE INVENTION

The object of the invention is to provide a flat and smooth cover profile which can be used in a simple way for forming coverings, and which would have an adequate resistance to meet requirements set by very severe climatic and mechanical conditions.

This object is achieved, according to the invention, by providing a cover profile having a wall thickness which continuously increases from one end portion of the cover profile to another end portion thereof, and having a greater packing at the end portion with a greater wall thickness than that at the end portion with a smaller wall thickness, and which is provided, at least on that outer surface thereof which is visible after attaching the cover profile to a support, with a protective layer which is firmly attached to the cover profile.

The continuously increasing wall thickness of the cover profile facilitates forming of a horizontal covering. Further, because the end portion with a greater wall thickness has a greater packing, it is able in cooperation with the firmly attached weather resistant protective layer better withstand unfavorable climatic and mechanical conditions.

According to the invention, there is also provided an apparatus for manufacturing the cover profile of the invention. The apparatus comprises a premolding press including a lower part having an outer base surface sloping from inside to outside. A frame encircles the lower part, is connected thereto for joint displacement therewith, and forms with the lower part a molding chamber. An outer part having an outer surface facing the outer surface of the lower part and likewise sloping from inside to outside is placed on the frame. The apparatus also comprises a press for hot pressing including a lower press part having a base surface sloping from outside to inside and having an outer rim portion, and an upper press part having an outer surface which slopes in the same direction as the base surface of the lower press part. While the apparatus of the invention can produce single cover profiles, it is advantageous to use it for manufacturing two cover profiles simultaneously.

To this end, the apparatus comprises a double premolding press and a double press for hot pressing formed each as a mirror-inverted arrangement of two respective single presses.

The cover profile is produced by filling a molding chamber of the premolding press of the apparatus according to the invention with a mixture to a predetermined flat horizontal plane. As a result, because of slanting of the outer base surface of the molding chamber, a larger amount of the mixture is loaded at an end of the molding chamber than in a middle thereof. Then a vertical force is applied to an upper part of the premolding press to compress the mixture in the molding chamber. The mixture is packed to a greater degree at the end of the molding chamber because of a greater amount of the mixture thereat. Thereafter the blank of a cover profile is removed from the premolding press and is placed in a press for hot pressing. The blank is rotated by 180° about its horizontal axis before being placed in the press for hot pressing. A force is applied to the upper press part of the press for hot pressing to move the upper press part downward while also applying heat to form a pressed cover profile.

These and other objects and advantages of the present invention will be best understood from the following detailed description of the preferred embodiment with reference to the accompanying drawings.

BRIEF DESCRIPTION OF THE DRAWING

FIG. 4 shows a cross-sectional view of a press for hot pressing in a closed condition;

FIG. 5 shows a partial cross-sectional view of the press shown in FIG. 4; and

FIG. 6 shows a partial view of an upper thickened edge of a pressed cover profile.

DESCRIPTION OF THE PREFERRED EMBODIMENT

Figure 1:
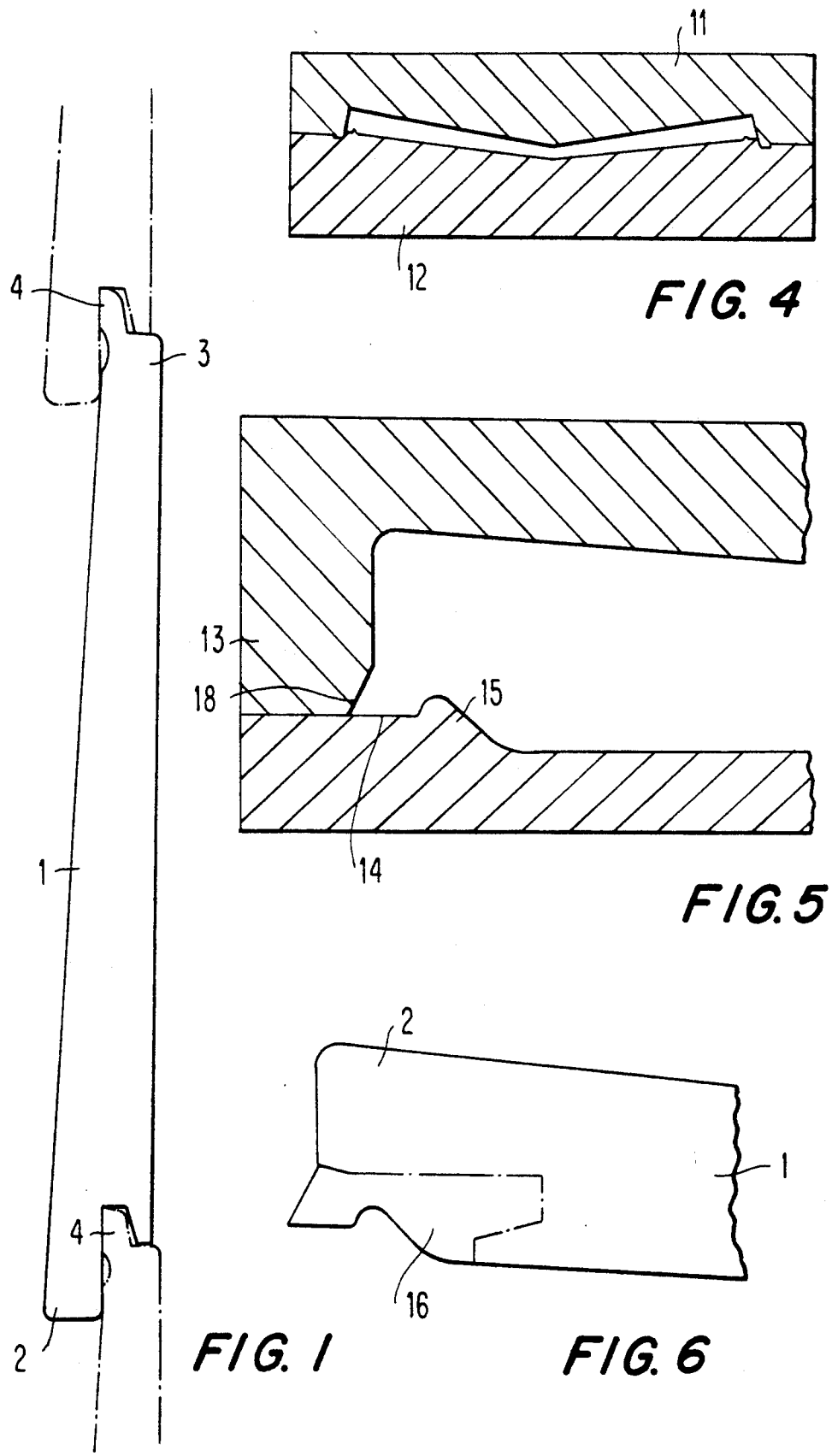
FIG. 1 shows a longitudinal view of a covering with a cover profile according to the present invention.

As shown in FIG. 1, the cover profile has such a shape that the wall thickness of the lower end portion 2 thereof is greater than the wall thickness of the upper end portion 3 thereof. The lower end portion 2 has an undercut and a recess in which, upon assembly of the covering, a nose-shaped tongue 4 of the upper end portion 3 of another cover profile is received. The upper end portion 3 has a plurality of fastening openings. Fasteners such as spikes or screws extending through these openings secure the cover profile to an appropriate support, i.e., to a wall of a building or a lathe attached to the building wall. Because the end portions 2 and 3 are loaded higher than other portions of the cover profile, the cover profile must have there a greater packing than the other portions of the cover profile.

Figure 2:
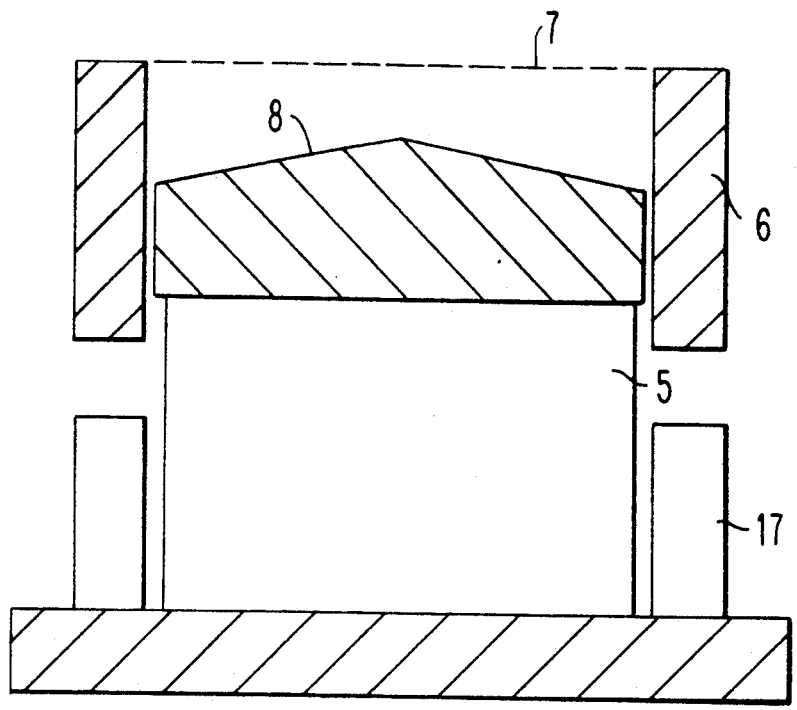
FIG. 2 shows a cross-sectional view of a lower part of a premolding press before loading the mixture.

FIG. 2 shows a lower part of a premolding press for manufacturing cover profiles according to the invention. The lower part includes a stationary center part 5 and surrounding it frame 6 which is movable up and down. In FIG. 2, the frame 6 is shown in an upper position thereof. The center part 5 and the frame 6 form a molding chamber which is loaded with a compressible mixture to the line 7. A base 8 formed by an outer surface of the center part 5 has a slanted surface so that a larger amount of the mixture can be loaded into the chamber at the left end thereof than in the middle.

Figure 3:
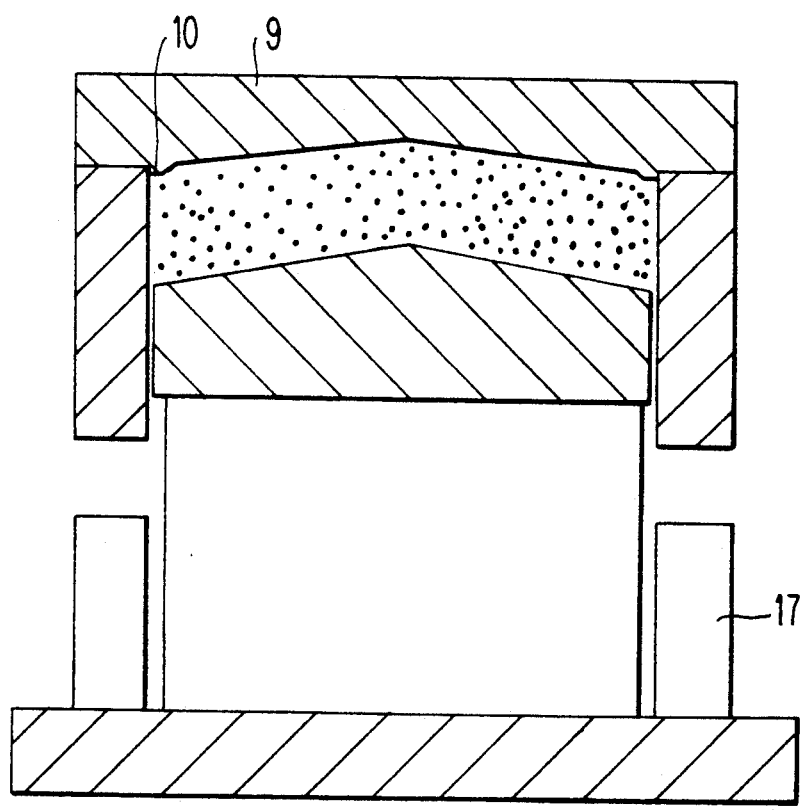
FIG. 3 shows a cross-sectional view of the premolding press with lower and upper parts.

The premolding press shown in FIGS. 2 and 3 and the press for hot pressing shown in FIG. 4 are designed such that two cover profiles can be manufactured thereon simultaneously. When only a single cover profile need be manufactured, only a half of the center part is used.

In the premolding press shown in FIG. 3, the molding chamber is filled with the mixture, and an upper part 9 of the press is mounted. The outer surface of the upper part 9 facing the molding chamber, has an outer rim resting on the frame 6. It is there where the cover profile must have a greater packing. To this end, the outer rim is provided with projections 10. When a vertical force is applied to the upper part 9, the upper part 9 together with the frame 6 moves downward until the frame 7 sits on posts 17. The mixture becomes compressed, and it is more compressed at the outer ends of the chamber than in the middle because a greater amount of mixture was loaded there and because of additional compression by projections 10.

After completion of the compression step, the frame 6 and the upper part 9 are brought back to an initial position as shown in FIG. 3. The blank is removed from the premolding press, is rotated by 180° about its longitudinal axis, and is placed into a press for hot pressing.

FIG. 4 shows a press for hot pressing with upper 11 and lower 12 parts in a closed condition. Before the blank is placed in the press, the inner and outer surfaces of the blank are covered with a priming foil which, upon hot pressing, flows and becomes firmly attached to the cover profile to form a protective layer.

FIG. 5 shows a left end portion of the press for hot pressing shown in FIG. 4, on an enlarged scale. FIG. 5 shows that the upper press part 11 has at its outer rim 13 a recess 18, and that the lower press part 12 has a projection 15 adjacent to its left rim 14. The recess 18 and the projection 15 cooperate to retain the blank in a predetermined position and to insure firm attachment of the protective layer and the blank.

When the cover profile 1 is manufactured, a portion 16 of the higher compressed lower end portion 2 and shown in FIG. 6 with a dash-dot line, is removed by profile milling.

While the invention has been illustrated and described with reference to a specific embodiment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An apparatus for manufacturing elongate cover profiles, comprising:
   a premolding press having an axis and including a lower part having an outer base surface, an upper part having an outer surface facing said outer base surface and defining therewith a first molding chamber, and a frame surrounding said lower part, said outer base surface sloping from the premolding press axis toward a side wall of said first molding chamber, and said outer surface of said upper part sloping from a side wall of said first molding chamber toward the premolding press axis and extending substantially in a same direction as said outer base surface extends; and
   a press for hot pressing having an axis and including a lower press part having a base surface, and an upper press part having an outer surface defining with said base surface a second molding chamber, said base surface sloping from a side wall of said second molding chamber toward the hot pressing press axis, and said outer surface of said upper press part sloping from the hot pressing press axis toward the side wall of said second molding chamber and extending substantially in a same direction as said base surface extends, said first molding chamber and said second molding chamber having mirror-inverted shapes.

2. Apparatus according to claim 1, wherein said upper part of said premolding press has an outer rim supported on said frame, and said outer surface of said upper part of said premolding press has a projection thereon located adjacent to the side wall of said first molding chamber and inward of said side wall.

3. Apparatus according to claim 1, wherein said upper press part of said hot pressing press has an outer rim portion supported on said lower press part and having an inner surface defining said side wall of said second molding chamber and having a recess adjacent to said base surface, said base surface of said lower base part having a projection thereon spaced from said recess in said inner surface.

* * * * *